(12) United States Patent  
Gangadharan et al.

(10) Patent No.: US 9,401,908 B1  
(45) Date of Patent: Jul. 26, 2016

(54) AUTHENTICATION INTERWORKING IN COMMUNICATIONS NETWORKS

(71) Applicant: Oracle International Corporation, Redwood Shores, CA (US)

(72) Inventors: Binod Pankajakshy Gangadharan, Bangalore (IN); Terje Strand, San Francisco, CA (US); Andreas E. Jansson, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 80 days.

(21) Appl. No.: 14/602,780

(22) Filed: Jan. 22, 2015

(51) Int. Cl.  
*H04L 9/00* (2006.01)  
*H04L 29/06* (2006.01)

(52) U.S. Cl.  
CPC ...................................... *H04L 63/08* (2013.01)

(58) Field of Classification Search  
CPC combination set(s) only.  
See application file for complete search history.

(56) References Cited

U.S. PATENT DOCUMENTS

| | | | | |
|---|---|---|---|---|
| 8,689,181 B2 * | 4/2014 | Biron, III | ................ | H04L 67/10 717/115 |
| 8,825,732 B2 * | 9/2014 | Piernot | ................... | G06F 9/546 379/10.03 |
| 8,990,325 B2 * | 3/2015 | Eaton | .................. | G06F 17/3089 709/206 |
| 9,037,735 B1 * | 5/2015 | Fallows | .................. | H04L 67/42 709/228 |
| 9,294,458 B2 * | 3/2016 | Singh | ....................... | H04L 63/08 |
| 2014/0222893 A1 | 8/2014 | Gangadharan et al. | | |
| 2014/0222894 A1 | 8/2014 | Gangadharan et al. | | |
| 2014/0222930 A1 | 8/2014 | Gangadharan et al. | | |
| 2014/0222957 A1 | 8/2014 | Gangadharan et al. | | |
| 2014/0222963 A1 | 8/2014 | Gangadharan et al. | | |

OTHER PUBLICATIONS

'Oracle Communications WebRTC Session Controller'; security guide; Release 7.0; E40975-01; Nov. 2013.

* cited by examiner

*Primary Examiner* — Beemnet Dada  
(74) *Attorney, Agent, or Firm* — Miles & Stockbridge P.C.

(57) ABSTRACT

A system performs authentication for real-time communications (RTC). The system receives a request from a browser application for web authentication of a user. The system then performs the web authentication by a security provider by reaching a first resource, where the security provider determines a security principal for the user. Subsequently, the system executes a security Groovy script to obtain an identity mapping from a second resource different than the first resource, where the identity mapping maps the security principal to an Internet Protocol (IP) Multimedia Subsystem (IMS) identity. The system then provides the identity mapping to a runtime Groovy script.

17 Claims, 3 Drawing Sheets

AUTHENTICATION INTERWORKING IN COMMUNICATIONS NETWORKS

FIELD

One embodiment is directed generally to a communications network, and in particular, to authentication in a communications network.

BACKGROUND INFORMATION

Voice communications are increasingly shifting to web and Internet based applications that are outside of traditional telephony networks. Enterprise users desire to access their unified communications applications with their own Internet connected mobile devices, and consumers increasingly prefer Internet based communications channels for accessing contact centers.

Some communications service providers ("CSPs") and enterprises have deployed real-time communications ("RTC") applications based on a protocol known as WebRTC. WebRTC is an open Internet standard for embedding real-time multimedia communications capabilities (e.g., voice calling, video chat, peer to peer ("P2P") file sharing, etc.) into a web browser. For any device with a supported web browser, WebRTC can use application programming interfaces ("APIs") to equip the device with RTC capabilities without requiring users to download plug-ins. By using WebRTC, CSPs may create new web based communications services and extend existing services to web based clients.

WebRTC communications are authenticated according to typical web authentication technologies and corresponding databases. However, some communications networks use authentication technologies and databases that are different than web authentication technologies and databases. This may cause authentication issues when a WebRTC applications needs to communicate with an entity in such communications networks.

SUMMARY

One embodiment is a system that performs authentication for real-time communications (RTC). The system receives a request from a browser application for web authentication of a user. The system then performs the web authentication by a security provider by reaching a first resource, where the security provider determines a security principal for the user. Subsequently, the system executes a security Groovy script to obtain an identity mapping from a second resource different than the first resource, where the identity mapping maps the security principal to an Internet Protocol (IP) Multimedia Subsystem (IMS) identity. The system then provides the identity mapping to a runtime Groovy script.

DETAILED DESCRIPTION

Embodiments provide flexible authentication for Real-Time Communications ("RTC") of a WebRTC browser application with another entity connected to a Session Initiation Protocol ("SIP") network. In one embodiment, a WebRTC gateway uses a security provider for performing web authentication and obtaining web security principals. The gateway then invokes a security Groovy script with the security principals to obtain a web-SIP identity mapping for the browser application. Accordingly, this embodiment decouples the security provider from identity mapping functionality. The Groovy script is flexible and can implement different functionalities for the mapping. For example, it may access a database, a Home Subscriber Server ("HSS"), a Representational State Transfer ("REST") server (which may be different than a REST server being accessed by the security provider), etc.

Figure 1:
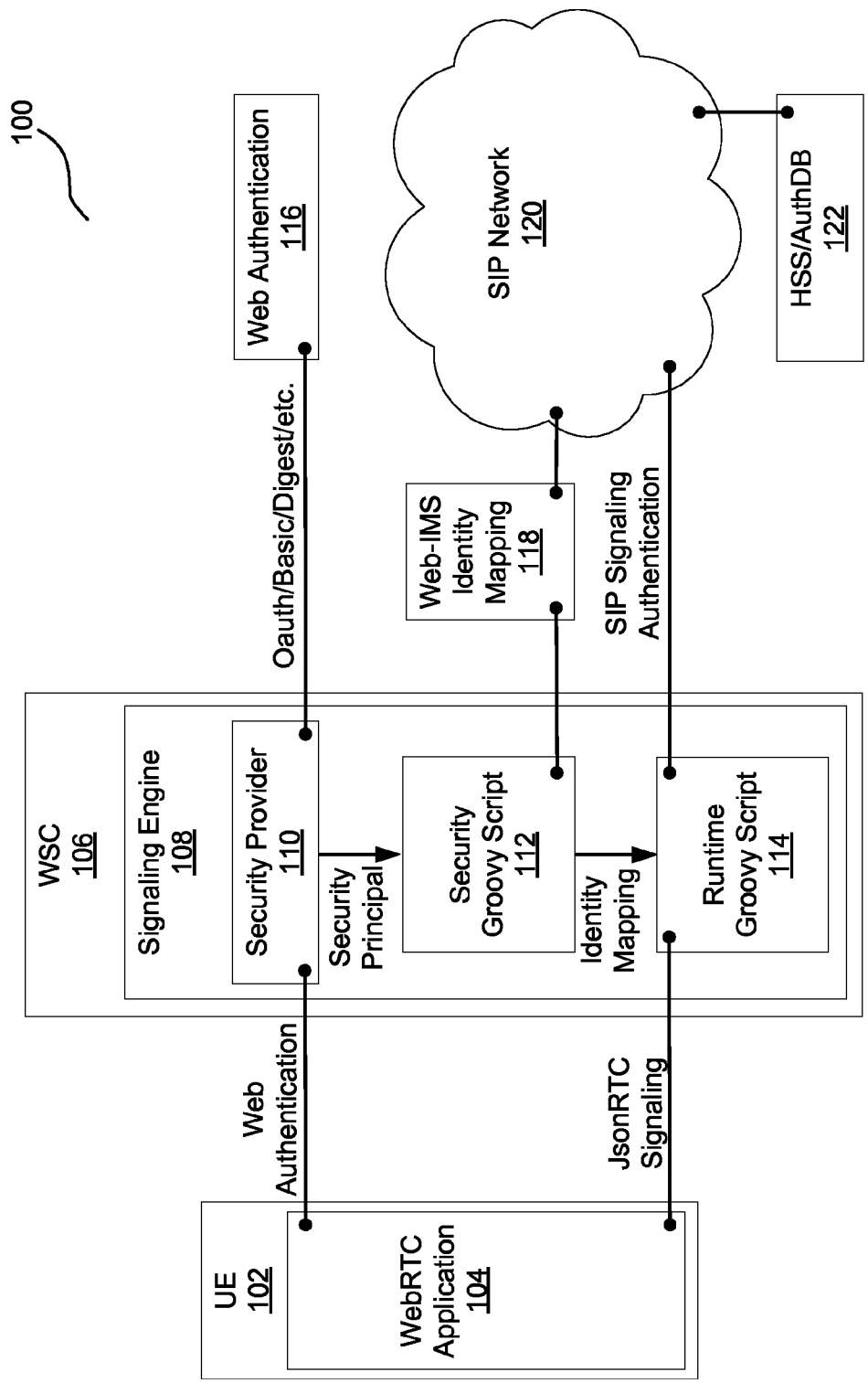
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that executes a WebRTC application 104 in a web browser. WebRTC technology enables RTC in a browser as defined in the Internet Engineering Task Force ("IETF") and World Wide Web Consortium ("W3C") standards. RTC refers to a mode of communications in which users exchange information instantly or with negligible latency. Thus, "real-time" can be synonymous with "live." UE 102 may be any device used by an end user for communications, such as a smartphone, a laptop computer, a tablet, etc.

In one embodiment, WebRTC application 104 performs RTC with an endpoint connected to a SIP network 120. SIP is a signaling communications protocol conventionally used for controlling multimedia communications sessions (such as voice and video calls) over Internet Protocol ("IP") networks. An example of SIP network 120 is an IP Multimedia Subsystem ("IMS") network. IMS is an architectural framework for delivering IP multimedia services.

Network 100 further includes a WebRTC session controller ("WSC") 106 that is a gateway for connecting a web application with a communications network. A gateway translates a protocol to another protocol. In FIG. 1, WSC 106 connects WebRTC application 104 to SIP network 120. WSC 106 provides interoperability for web-to-web and web-to-network RTC. WSC 106 includes a signaling engine 108 that bridges WebRTC signaling to SIP signaling. That is, in order to initiate RTC between WebRTC application 104 and an entity connected to SIP network 108, WebRTC application 104 establishes a signaling channel with WSC signaling engine 108 over a JavaScript Object Notation ("JSON") protocol for RTC ("JsonRTC"). JSON is a lightweight data-interchange format. JsonRTC establishes the sessions and subsessions used to pass messages between WSC and its client applications. Then, another signaling channel based on SIP is established between signaling engine 108 and SIP network 120.

Figure 2:
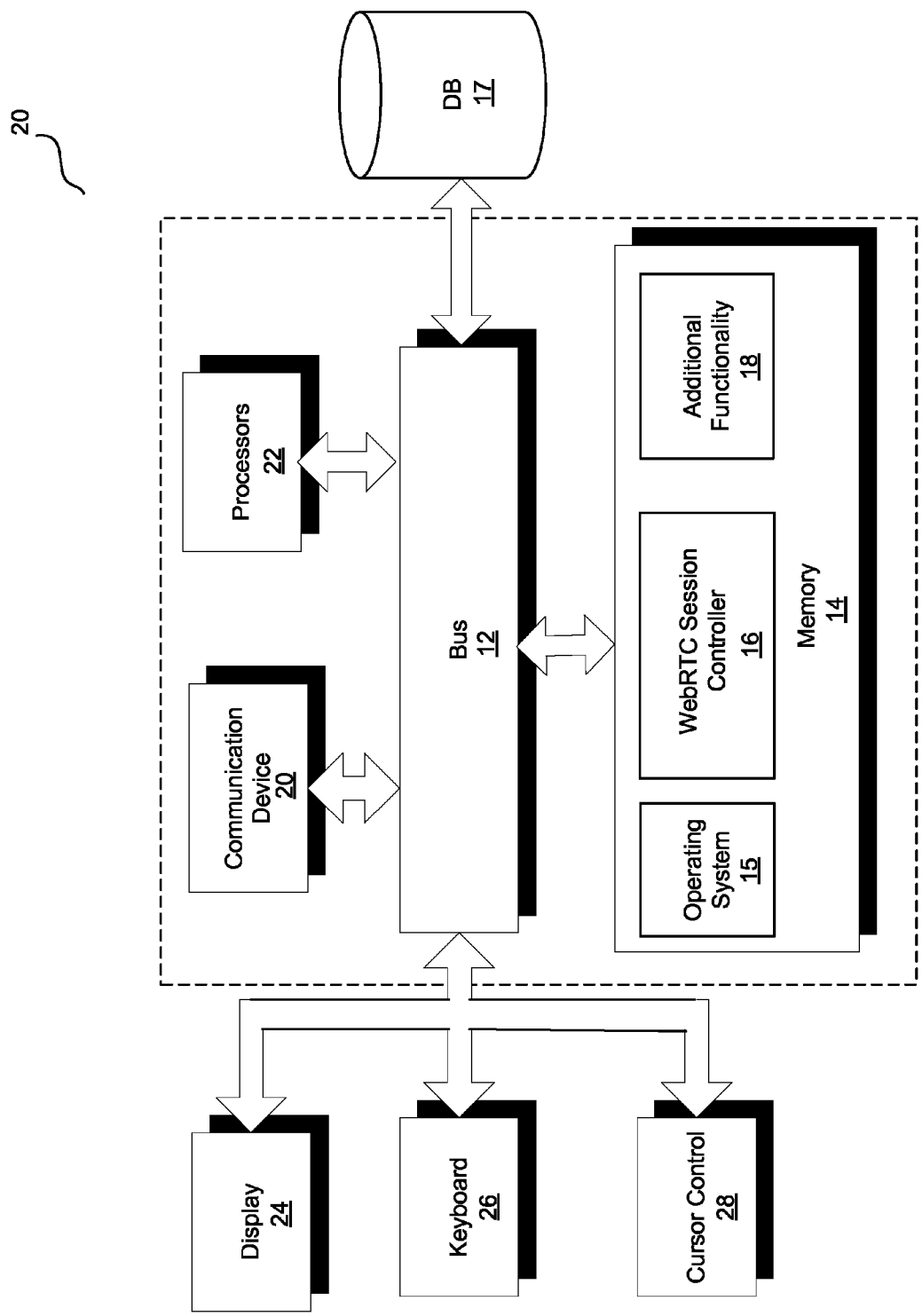
FIG. 2 is a block diagram of a computer server/system in accordance with embodiments of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a session controller, system 10 may be a server that in general has no need for a display 24 or one or more other components shown in FIG. 2.

System 10 includes a bus 12 or other communications mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communications device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communications media. Communications media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include WebRTC session controller module 16 for providing authentication, and all other functionality disclosed herein. System 10 can be part of a larger system, such as added functionality to the "Oracle Communications WebRTC Session Controller" from Oracle Corp. Therefore, system 10 can include one or more additional functional modules 18 to include the additional functionality. A database 17 is coupled to bus 12 to provide centralized storage for modules 16 and 18.

Referring again to FIG. 1, with known systems, when WebRTC application 104 that is running in a web browser or mobile device communicates with a web server, this communication is authenticated using typical web authentication technologies such as OAuth, basic access authentication (or basic authentication), form based authentication (or form authentication), mutual authentication, etc. OAuth is an open standard of authorization which provides client applications with secure delegated access to server resources on behalf of a resource owner. Basic access authentication is a method for a Hypertext Transfer Protocol ("HTTP") user agent to provide a user name and password when making a request. Form based authentication refers to the notion of a user being presented with an editable form to fill in security credentials such as password and submit in order to log into some system or service. Mutual authentication (or two-way authentication) refers to the notion of two parties authenticating each other at the same time.

With known systems, while WebRTC communications are authenticated using typical web authentication technologies, SIP network 120 may have a different way of authentication and identity management that is based on SIP signaling. For example, an IMS system may perform authentication and identity management based on the 3rd Generation Partnership Project ("3GPP") specifications that use IMS public and private identities. IMS public identity (or IP Multimedia Public Identity ("IMPU")) is used by a user for requesting communications to other users. IMS private identity (or IP Multimedia Private Identity ("IMPI")) is a unique permanently allocated global identity assigned by a home network operator, and used, for example, for registration, authorization, administration, and accounting purposes. Authentication with an IMS network is usually performed using SIP signaling. This may cause a problem for authentication interworking for RTC between WebRTC endpoints and IMS/SIP endpoints.

One known solution to provide authentication interworking between IMS networks and a web browser is to implement a security provider at a gateway to integrate web authentication with IMS identity and authentication framework. In this known solution, the security provider accesses an authentication mapper (which may be a REST server), first for performing usual web authentications, and then for obtaining a corresponding web-IMS identity mapping. REST is an architectural style including a coordinated set of architectural constraints applied to components, connectors, and data elements, within a distributed hypermedia system.

One disadvantage with this known approach is that the security provider accesses a single REST server for both web authentication and web-IMS identity mapping, hence this known solution is limited to the authentication functionality provided by such REST server.

In contrast to the known solutions, one embodiment of the present invention provides flexible interworking between web authentication and SIP authentication by using a WebRTC gateway that includes a security provider that is decoupled from identity mapping functionality. This embodiment implements a security Groovy script within the WebRTC gateway for performing identity mapping. Groovy is an object-oriented programming language for the JAVA platform. It permits access to the syntax tree during the compiling process before bytecode (or machine code) has been generated. Generally, Groovy is a superset of JAVA and therefore JAVA code may likely be syntactically valid in Groovy. However, Groovy includes additional syntax and features in addition to what is available in JAVA. Similar to JAVA, Groovy code can be compiled into bytecode. This bytecode can be translated by a virtual machine ("VM") into machine code. In one embodiment, the security Groovy script is flexible and can implement different functionalities for the mapping. For example, it may access a database, an HSS (i.e., the master user database that supports IMS network entities that handle calls and sessions), another REST server (different than the REST server accessed by the security provider), etc.

Referring again to FIG. 1, in one embodiment, when a browser application (e.g., WebRTC application 104) authenticates with a system, WSC 106 uses a WebLogic platform for authentication to implement usual web authentication mechanisms such as OAuth, basic authentication, form authentication, etc., to authenticate the HTTP request. WebLogic is a Java enterprise edition application server from Oracle Corp. When WebRTC application 104 contacts WSC 106, WSC 106 performs web authentication by using a security provider 110 inserted into the WebLogic platform.

Security provider 110 may be, for example, a REST based basic authentication provider, a OAuth provider, etc. Security provider performs web authentication 116 to establish a web security principal (e.g., alice@gmail.com) corresponding to WebRTC application 104. A principal in computer security is an entity that can be authenticated by a computer system or network. It is referred to as a security principal in programming literature such as Java and Microsoft. Principals can be, for example, individual people, computers, services, computational entities such as processes and threads, or any group of such things. They need to be identified and authenticated before they can be assigned rights and privileges over resources in the network. A principal typically has an associated identifier (such as a security identifier) that allows it to be referenced for identification or assignment of properties and permissions.

Then, WSC 106 invokes a security Groovy script 112 with the web security principal. Using the web security principal, security Groovy script 112 fetches corresponding web-IMS identity mapping 118 from a source that can provide such mapping (i.e., the source includes an identity mapping between the security principal and a corresponding IMS identity). In one embodiment, the source may be an authentication mapper or an authentication database (e.g., HSS 122, another database, etc.). In one example embodiment, security Groovy script 112 may communicate with a REST based authentication mapper to map the web identity to necessary IMS principals on successful authentication. However, embodiments provide flexibility such that if a customer desires to provide an authentication mapper that is not based on REST invocation, a custom authentication mapper may be used.

Accordingly, embodiments decouple security provider 110 from security Groovy script 112 such that different/separate resources may be reached for Web authentication 116 and Web-IMS identity mapping 118. Additionally, by decoupling security provider 110 from security Groovy script 112, the implementation of security Groovy script 112 and runtime Groovy script 114 may be pluggable, independent of each other, and independent of security provider 110. For example, when security Groovy script 112 is pluggable, security provider 110 may be any authentication provider without affecting the operation of runtime Groovy script 114. Similarly, Web-IMS identity mapping 118 may be based on any IMS identity mapping without affecting the operation of security provider 110 or runtime Groovy script 114. Therefore, embodiments provide a comprehensive and complete authentication interworking between Web and IMS.

Once the mapping information is available, it is kept associated with the web principal. The established web-IMS identity mapping is then made available to a runtime Groovy script 114 by WSC 106. In one embodiment, if an IMS provider decides to not have any further authentication as well, this information may also be saved by security Groovy script 112. For example, if an IMS provider is set up so that WSC 106 and the corresponding IMS network (e.g., SIP network 120) are in a trusted security domain, security groovy script 112 fetches the mapping information and makes it available to runtime groovy script 114. Then, during JsonRTC signaling, runtime groovy script 114 passes special SIP headers (e.g., P-Asserted-Identity) to indicate that the authentication is already carried out, and the IMS provider honors this indication.

In one embodiment, when signaling is performed for RTC (e.g., to initiate a call), runtime Groovy script 114 uses the established mapped IMS credentials to satisfy an authentication challenge from a server in SIP network 120, e.g., IMS serving call session control function ("S-CSCF") server (i.e., a central node of the signaling plane which is a SIP server that performs session control as well), SIP registrar server (i.e., a server that accepts "REGISTER" requests and places the information received in those requests into the location service for the domain it handles), etc. For example, for SIP signaling, WSC 106 acts as a SIP client and inserts the necessary authentication data into SIP messages. This data may include one or more of IMS public identity, IMS private identity, 3GPP authentication parameters, P-Asserted-Identity, etc. P-Asserted-Identity includes the identity of the originator of a request (i.e., a call) within a trusted network.

In one embodiment, WSC 106 also transparently handles digest authentication challenges that come from SIP network 120 which may be, for example, an IMS network. Digest authentication (or digest access authentication) is a challenge-response authentication where one party presents a question (or challenge) and another party must provide a valid answer (or response) to be authenticated. In one embodiment, digest authentication may be used by a web server to negotiate credentials (e.g., username or password) with a web browser of a user to confirm the identity of the user before sending sensitive information such as online banking transaction history. For example, when an IMS provider does not support any identity mapping and instead directly challenges the user, runtime groovy script 114 passes the challenge to the client side SDK (e.g., JavaScript, Android, iOS, etc.). The SDK then lets the client application and the user handle the challenge by entering their SIP credentials directly.

In one embodiment, the customer environment may not have authentication mapping data. For example, a carrier (i.e., a telecommunications company) may not be able to provide a mapping between the web principal of the user and an IMS principal. This may happen, for example, if a telecommunications company does not ask a customer for a facebook ID when the customer is signing up for a service. Thus, there cannot be a mapping between facebook credentials and the IMS identity of the customer. When such mapping information is not available, WSC 106 transparently challenges the user (i.e., WebRTC application 104 at UE 102) for the user name and password when the SIP authentication is performed at the time of initiating an RTC for such user. For example, if the user of WebRTC application 104 has not already provided credentials, and hence a mapping of the credentials has not been performed, and such user subsequently attempts to establish RTC, WSC 106 requests WebRTC application 104 for the username and password of the user at that time.

In one embodiment, when a SIP message is received by WSC 106, signaling engine 108 translates the message to JSON. The SIP message may be, for example, an incoming call into a web application (i.e., a SIP INVITE message reaching WSC 106). The translated message is then sent to the correct node by a fabric component of signaling engine 108 of WSC 106. Fabric is a component that brokers message frames and/or other information across nodes in a cluster. A cluster includes multiple server instances running simultaneously and working together to provide increased scalability and reliability. Fabric ensures that the correct node handles the message. Once the node receives the message, the necessary protocol handling for JsonRTC protocol is carried out. The message is then sent to the browser client.

In one embodiment, WSC 106 supports two ways of authenticating users: authentication based on token or client-cert (e.g., Facebook OAuth token), and HTTP basic authentication (e.g., based on username and password). The following functionality provides an example web.xml of WSC 106 module in accordance with one embodiment.

<login-config>
       <auth-method>CLIENT-CERT,BASIC</auth-method>
       <realm-name>default</realm-name>
    </login-config>

That is, WSC 106 first tries to see if there is any authorization token in a request. If so, it tries to authenticate the user of WebRTC application 104 with that authorization token. If WSC 106 does not find an authorization token, it prompts the client (i.e., WebRTC application 104) to enter username and password corresponding to HTTP basic authentication.

In one embodiment, signaling engine 108 provides Web-Socket applications that are protected. That is, a user (i.e., WebRTC application 104) needs to be authenticated before getting access to the WebSocket applications. A socket is a bidirectional communications endpoint for sending/receiving data to/from another socket. It is the fundamental technology for programming software to communicate on a transmission control protocol ("TCP")/IP network. A WebSocket is a protocol providing a full duplex communications channel over a single TCP connection. In this embodiment, WSC 106 performs web authentication before establishing a WebSocket connection with WebRTC application 104. However, once the WebSocket connection is established, no further web authentication is needed for WebRTC application 104 to access WebSocket applications provided by WSC signaling engine 108.

In one embodiment, security provider 110 of signaling engine 108 supports different kinds of identity asserters and authentication providers. An identity asserter is an entity which validates a token or certificate and returns a principal name based on the validated token. An authentication provider is an entity which, in case of username/password authentication, verifies the supplied user name and password. If successful, the authentication provider adds a list of principal (e.g., javax.security.Principal) objects into the subject (e.g., javax.security.auth.Subject). Further, in case of token authentication, the authentication provider adds a list of principal objects into the subject based on the principal name returned by an identity asserter.

The authentication provider may be, for example, based on Lightweight Directory Access Protocol ("LDAP"), based on a relational database management system ("RDBMS"), etc. LDAP is an open, vendor-neutral, industry standard application protocol for accessing and maintaining distributed directory information services over an IP network. The identity asserter may be, for example, based on Security Assertion Markup Language ("SAML"). SAML is an Extensible Markup Language ("XML") based, open-standard data format for exchanging authentication and authorization data between parties.

In one embodiment, signaling engine 108 further allows writing custom authentication providers and identity asserters, chaining them in any order, and providing configuration flags to control the flow in the chain of authentication providers and identity asserters based on the result of each provider in the chain. A provider in the chain is provided with the visibility to the principals returned by another provider who is in the chain prior to it. Once the authentication is successfully performed, a corresponding subject has the populated principal objects, as well as public and private credentials populated by the authentication providers. A subject is the absolute entity that requested (or carried out) authentication. A subject may have different principals. For example, the name of a subject may be Bob, while his driving license ID, email ID, and facebook ID may be different than Bob. Once the subject is populated with principal objects and public and private credentials, the authentication request enters the signaling engine code (i.e., runtime Groovy script 114). Signaling engine 108 retrieves the authenticated subject in the thread and stores the credentials (e.g., SIP identity and SIP credentials) from the subject into the fabric of signaling engine 108 for later use. For example, the credentials may be needed in another node in a cluster for mapping JSON to SIP.

In one embodiment, signaling engine 108 further supports Facebook OAuth Identity asserter which validates Facebook OAuth tokens and returns a principal name for that token. In one embodiment, signaling engine 108 further supports a REST based authentication provider that invokes a REST web service to validate a supplied user name and password.

In one embodiment, if an application in signaling engine 108 needs to be accessible to any user (e.g., anonymous access), the corresponding allowed principals are set to "guest." In addition, a signaling engine servlet authentication filter needs to be enabled in the security provider chain and configured with a uniform resource locator ("URL") pattern that is handled for guest access. The servlet authentication filter inspects the authentication request before the authentication providers are invoked. If the incoming request matches a signaling engine application URL pattern which is configured for guest access, and if there are no other authorization headers in the request, the servlet authentication filter adds an authorization header such that the request goes through the provider chain and the authentication succeeds as a guest user. The following configuration in WSC 106 is an example where a single "guest" principal is populated into the authenticated subject, in accordance with one embodiment.

<application>
    <active>true</active>
    <moduleName>webrtc</moduleName>
    <name>freecall</name>
    <package>register</package>
    <package>call</package>
    <requestUri>/ws/webrtc/freecall</requestUri>
    <allowedPrincipals>guest</allowedPrincipals>
    </application>

In one embodiment, in order to map web identity to SIP identity, one of the authentication providers in the chain populates the subject with corresponding SIP credentials. In one embodiment, this authentication provider may be a custom security provider developed by the customer and implemented along with security Groovy script 112. The security framework allows adding any number of principals, as well as public and private credentials, to the subject. For example, if the customer already has an identity assertion system in place, the customer can add a custom authentication provider in the chain such that it looks at the principal returned by the identity asserter, finds the SIP credentials for that principal, and adds the SIP credentials to the subject.

Alternatively or additionally, if the customer is using an existing authentication provider, such provider may look at the principal returned by the identity asserter, find the SIP credentials for that principal, and add the SIP credentials to the subject. In one embodiment, security Groovy script 112 can be customized by the customer based on the security providers that the customer will use (i.e., will anticipate to use) to establish mapping between web identity to SIP identity. At runtime, runtime Groovy script 114 in signaling engine 108 fetches the subject information from the fabric of signaling engine 108, retrieves the SIP credentials from the subject, and uses the SIP credentials in order to make a SIP request to SIP network 120.

In one example embodiment, security provider 110 of signaling engine 108 is a REST authentication provider. Such a REST authentication provider is invoked when a user of a browser application (i.e., WebRTC application 104) submits a username and password to login to signaling engine 108 (e.g., using the basic authentication dialog or a form based login page). The REST authentication provider sends the request to a configured REST web service endpoint with the user name and password in the basic authentication header. If the response from the REST endpoint is "200 OK," the authentication is considered to be successful. Any other response code indicates that the authentication has failed. In one embodiment, the REST endpoint URL can be configured through an administrator console of WSC 106.

Figure 3:
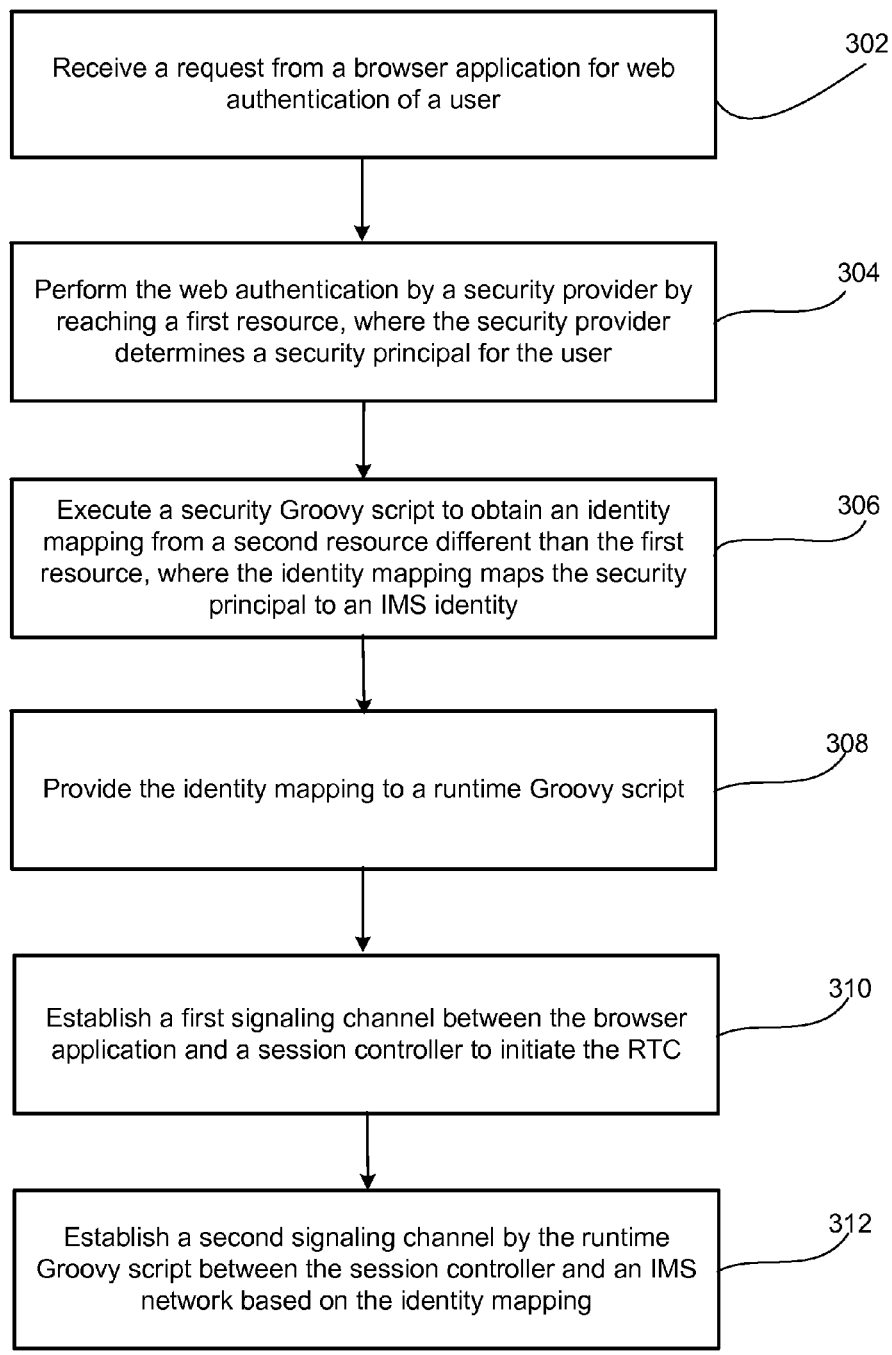
FIG. 3 is a flow diagram of the operation of the WebRTC session controller module of FIG. 2 when managing authentication in accordance with embodiments of the present invention.

FIG. 3 is a flow diagram of the operation of WebRTC session controller module 16 of FIG. 2 when managing authentication in accordance with embodiments of the present invention. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, WebRTC session controller module 16 receives a request from a browser application (e.g., WebRTC application 104 at UE 102) for web authentication of a user.

At 304, security provider 110 performs web authentication 116. When performing web authentication 116, security provider determines a security principal for the user of the browser application (e.g., WebRTC application 104 at UE 102).

At 306, security Groovy script 112 is executed by signaling engine 108 to determine an identity mapping 118 that maps the security principal to an IMS identity. In one embodiment, security Groovy script 112 obtains the identity mapping from an authentication database (e.g., HSS 122) or an authentication mapper which may be different than the resources reached by security provider 110 for performing web authentication.

At 308, security Groovy script 112 provides the identity mapping to runtime Groovy script 114. The identity mapping is saved/stored at WSC 106 to be used later for initiating RTC between the browser application (e.g., WebRTC application 104 at UE 102) and another entity connected to SIP network 120 (which may be, for example, an IMS network).

At 310, when initiating RTC for the browser application (e.g., WebRTC application 104 at UE 102), a signaling channel is established between the browser application (e.g., WebRTC application 104 at UE 102) and signaling engine 108 of WSC 106. In one embodiment, the browser application is a WebRTC application, and this signaling channel is established according to JsonRTC.

At 312, another signaling channel is established by runtime Groovy script 114 between the session controller (signaling engine 108 of WSC 106) and SIP network 120 (which may be, for example, an IMS network) based on the identity mapping. This signaling channel is established according to SIP. In one embodiment, based on the identity mapping, runtime Groovy script 114 inserts corresponding authentication data into SIP messages. In one embodiment, the authentication data includes one or more of IMS public identity, IMS private identity, 3GPP authentication parameters, or P-Asserted-Identity.

As disclosed, embodiments provide flexible authentication for RTC between a WebRTC browser application and an entity connected to a SIP network. Embodiments bridge web authentication and SIP authentication by using a web-SIP WebRTC gateway such that web authentication is integrated with IMS identity and authentication framework. In one embodiment, the WebRTC gateway uses a security provider for performing web authentication and obtaining web security principals. The gateway then invokes a security Groovy script with the security principals to obtain a corresponding web-SIP identity mapping. Accordingly, embodiments decouple the security provider from identity mapping. The Groovy script is flexible and can implement different functionalities for the mapping. For example, it may access a database, an HSS, a REST server (which may be different than a REST server accessed by the security provider), etc.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to perform authentication for real-time communications (RTC), the performing comprising:
    receiving a request from a browser application for web authentication of a user;
    performing the web authentication by a security provider by reaching a first resource, wherein the security provider determines a security principal for the user;
    executing a security Groovy script to obtain an identity mapping from a second resource different than the first resource, wherein the identity mapping maps the security principal to an Internet Protocol (IP) Multimedia Subsystem (IMS) identity;
    providing the identity mapping to a runtime Groovy script;
    establishing a first signaling channel between the browser application and a session controller to initiate the RTC; and
    establishing a second signaling channel by the runtime Groovy script between the session controller and a session initiation protocol (SIP) network based on the identity mapping.

2. The computer-readable medium of claim 1, wherein the first signaling channel is established according to a JavaScript Object Notation (JSON) protocol for RTC (JsonRTC).

3. The computer-readable medium of claim 1, wherein the second signaling channel is established according to SIP.

4. The computer-readable medium of claim 3, wherein, based on the identity mapping, the runtime Groovy script inserts corresponding authentication data into SIP messages.

5. The computer-readable medium of claim 4, wherein the authentication data includes one or more of IMS public identity, IMS private identity, $3^{rd}$ Generation Partnership Program (3GPP) authentication parameters, or P-Asserted-Identity.

6. The computer-readable medium of claim 1, wherein the security Groovy script obtains the identity mapping from an authentication database or an authentication mapper.

7. A method of authentication for real-time communications (RTC) comprising:
    receiving a request from a browser application for web authentication of a user;
    performing the web authentication by a security provider by reaching a first resource, wherein the security provider determines a security principal for the user;
    executing a security Groovy script to obtain an identity mapping from a second resource different than the first resource, wherein the identity mapping maps the security principal to an Internet Protocol (IP) Multimedia Subsystem (IMS) identity;
    providing the identity mapping to a runtime Groovy script;
    establishing a first signaling channel between the browser application and a session controller to initiate the RTC; and establishing a second signaling channel by the runtime Groovy script between the session controller and a session initiation protocol (SIP) network based on the identity mapping.

8. The method of claim 7, wherein the first signaling channel is established according to a JavaScript Object Notation (JSON) protocol for RTC (JsonRTC).

9. The method of claim 7, wherein the second signaling channel is established according to SIP.

10. The method of claim 9, wherein, based on the identity mapping, the runtime Groovy script inserts corresponding authentication data into SIP messages.

11. The method of claim 10, wherein the authentication data includes one or more of IMS public identity, IMS private identity, 3rd Generation Partnership Program (3GPP) authentication parameters, or P-Asserted-Identity.

12. The method of claim 7, wherein the security Groovy script obtains the identity mapping from an authentication database or an authentication mapper.

13. A system for authentication for real-time communications (RTC) comprising:
a processor coupled to a storage device that stores instructions, the processor executing the instructions to implement modules comprising:
a receiving module that receives a request from a browser application for web authentication of a user;
a performing module that performs the web authentication by a security provider by reaching a first resource, wherein the security provider determines a security principal for the user;
an executing module that executes a security Groovy script to obtain an identity mapping from a second resource different than the first resource, wherein the identity mapping maps the security principal to an Internet Protocol (IP) Multimedia Subsystem (IMS) identity;
a providing module that provides the identity mapping to a runtime Groovy script; and
an establishing module that establishes a first signaling channel between the browser application and a session controller to initiate the RTC,
the establishing module further establishing a second signaling channel by the runtime Groovy script between the session controller and a session initiation protocol (SIP) network based on the identity mapping.

14. The system of claim 13, wherein the first signaling channel is established according to a JavaScript Object Notation (JSON) protocol for RTC (JsonRTC).

15. The system of claim 13, wherein the second signaling channel is established according to SIP.

16. The system of claim 15, wherein, based on the identity mapping, the runtime Groovy script inserts corresponding authentication data into SIP messages.

17. The system of claim 16, wherein the authentication data includes one or more of IMS public identity, IMS private identity, 3rd Generation Partnership Program (3GPP) authentication parameters, or P-Asserted-Identity.

* * * * *